Dec. 25, 1934.  W. T. MUNSON  1,985,666
FLYER
Filed Feb. 21, 1934
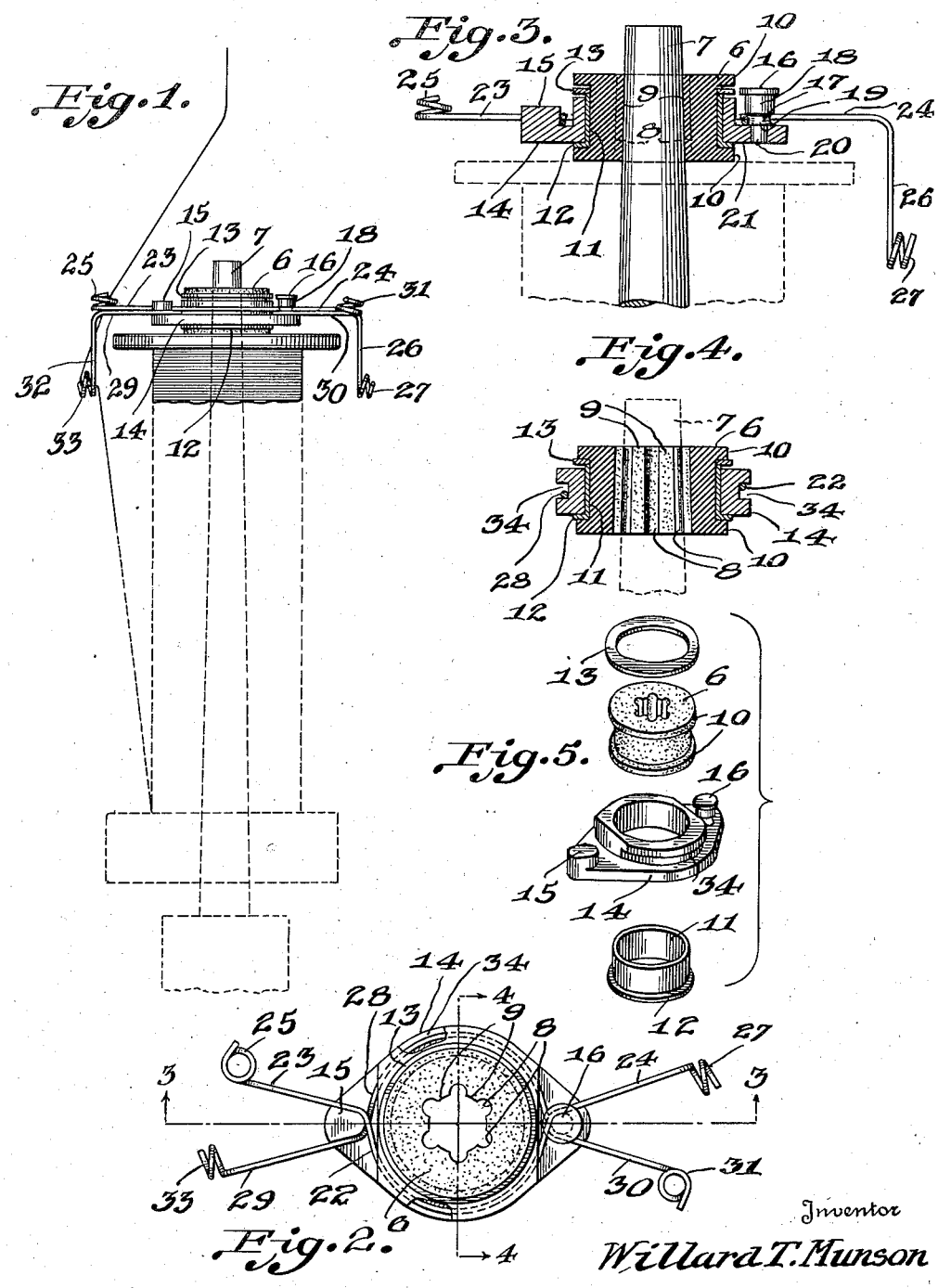
Inventor
Willard T. Munson
By Mawhinney & Mawhinney
Attorneys Patented Dec. 25, 1934

1,985,666

UNITED STATES PATENT OFFICE 1,985,666

FLYER

Willard T. Munson, Dunmore, Pa., assignor to Henry E. Collins and Albert B. Collins, both of Scranton, Pa., copartners, doing business under name and style of Collins Supply & Equipment Co.

Application February 21, 1934, Serial No. 712,394

7 Claims. (Cl. 117—23)

The present invention relates to improvements in flyers, and has for an object to provide an improved flyer in which the wires may be detachable for replacement, and in which a novel arrangement of bushing is provided for enabling the flyer to be firmly secured upon a tapering or straight spindle at any desired point along the axis thereof.

A further object of the invention resides in a novel form of rubber and metal bushings in connection with the mounting of the same in the flyer block, to the end that these parts may be assembled and disassembled as many times as may be required to substitute new bushings whenever the same become worn without requiring the entire block to be replaced.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side view of a spindle, bobbin and the improved flyer shown with the thread engaged therein in a position of use.

Figure 2 is a top plan view, with parts broken away.

Figure 3 is a vertical section taken longitudinally through the improved flyer on the line 3—3 in Figure 2.

Figure 4 is a cross section taken on the line 4—4, also in Figure 2, and

Figure 5 is a group view of the various parts in disassembled position.

Referring more particularly to the drawing, 6 represents a rubber bushing having an internal bore preferably tapering, as indicated in Figure 4, for the purpose of gripping a straight or tapered spindle 7. The bore of the bushing is formed with longitudinal grooves 8 separated by gripping ribs 9 having inner gripping surfaces of substantial extent both longitudinally and circumferentially to take tightly against the cylindrical or conical surface of the spindle 7.

The bushing 6 at its ends is provided with outwardly extending flanges 10, such flanges being for the purpose of holding the assembly together. The flanges, being of rubber, or other suitable elastic or resilient material, will admit of being compressed when the brass or metal bushing 11 is forced onto the rubber bushing 6. The metallic bush 11 is cylindrical in general form and may be made from brass, steel, alloy or other metal with a permanent outstanding flange 12 at one end and a separate flange 13 at its other end. The opening through the separate flange 13 is of the same diameter as the opening through the cylindrical bush 11 so that the removable flange 13 will engage against the flangeless end of the metallic bush 11, the end of the bush 11 thus acting as a stop or abutment for the removable flange 13, preventing the flange 13 from being forced by the rubber flange 10 against the flyer block which is indicated generally at 14.

This flyer block 14 may be of phenolic condensation product, such as "Bakelite", or a metal if desired, which metal will be of a different character and composition from the bush 11 owing to the fact that it would not be advisable to make the two parts that rotate relatively to one another of the same material. Preferably the flyer block 14 will be made of phenolic condensation product, such as "Bakelite", impregnated with graphite to be self-lubricating.

At one side of the flyer block 14 is a permanent post 15 which may be molded in one piece with the body of the flyer block 14, or cast or otherwise formed thereon. At the other side of the flyer block is a removable pin 16. This pin may be of steel or other suitable material formed with an annular groove 17 to receive the flyer wires. This groove 17 is in the intermediate portion of the pin. Toward the head side of the pin is an enlarged shank portion 18 forming a shoulder at this side of the groove 17. There is also a shoulder 19 at the opposite side of the groove 17 and outwardly beyond the shoulder 19 is a reduced trunnion 20 adapted to fit into an opening 21 made in the flyer block to rather snugly receive the same.

The flyer wires are two in number. One wire has the semi-circular intermediate portion 22 with the arms 23 and 24. The arm 23 carries an eye 25 while the arm 24 has a downwardly projecting extension portion 26 carrying an eye 27.

The other wire has an intermediate cylindrical portion 28 with arms 29 and 30 extending off therefrom, the arm 30 having an eye 31, and the arm 29 having a downward extension 32 carrying an eye 33.

The semi-circular portions 22 and 28 fit in opposite directions about the flyer block and are held in grooves 34 thereof. The wires are crossed about the permanent pin or lug 15 and are also crossed upon the pin 16, the wires engaging in the groove 17 thereof and serving to hold the pin in the opening 21.

The arms 24 and 30 may be spread apart to move the wires out of the groove 17, whereupon the pin 16 may be lifted out of the opening 21 and disengaged from the flyer block. Thereupon the semi-circular portions 22 and 28 may be swung out radially from the groove 34 of the flyer block and thence disengaged from the permanent pin or lug 15. In this way a new set of flyer wires may be readily replaced, first crossing the arms 23 and 29 upon the permanent pin or lug 15, after which the semi-circular intermediate parts of the wires are brought together into the groove 34. The ends 24 and 30 being crossed and sprung apart in the fingers, the detachable pin 16 may be reinserted in the opening 21. When the arms 24 and 30 are released, the inherent resiliency of the same will cause them to come together into the groove 17. The wires will thus hold the pin from escaping from the flyer block but the arrangement is such as to permit easy detachment of the pins and the wires.

When, during the rapid rotation in use of the flyer, contact is accidentally made with the wires, as by the arm of the workman, the shock coming on either wire arm 24 and 30 which engage about the pin will have a tendency to lock the flyer wires tighter about the pin rather than causing their disengagement from the pin and removal from the block.

The rubber bushing can be pushed up or down on any part of the spindle 7 and will at all points grip the spindle tightly due to its inherent resiliency. Moreover such rubber housing will not become sprung like a split metal sleeve, but the elasticity of the rubber will be retained for a long space of time and the rubber will always grip no matter where placed. This rubber bushing eliminates the common practice of using a mill nut for holding the flyer on the spindle. In applying the rubber bushing down upon the spindle the gripping surfaces of the ribs 9 will engage the spindle and as the bushing is pushed downwardly onto the tapered spindle the ribs 9 will tend to expand laterally and circumferentially, and the spaces or grooves 8 allow proper room for such expansion. Of course the ribs 9 will also be forced radially outward against the surrounding mass of rubber in the bushing 6, thus exerting great elastic pressure. This elastic pressure reacts against the metallic bush 11 and the stress and strain set up in the resilient mass will result in the ribs very tightly gripping the spindle as is necessary because of the high rotational speeds of the same. When the flyer is struck while in rotation there is a tendency to stop the flyer while the spindle 7 continues to rotate and this results in uneven shock or tension on the flyer. This shock will be absorbed by reason of the ribs 9 being forced circumferentially into the grooves 8 and the rib construction is such that there will be a circumferential or rotational resiliency to a high degree in the device.

In assembling the device, the metallic bush 11 is inserted in the opening in the flyer block 14 and the detachable flange 13 placed against the other side of the flyer block and metallic bush 11. The rubber bushing 6 is thereupon forced through the opening in the metallic bush 11, one of the flanges 10 being contracted for this purpose. This flange will automatically expand again as soon as it arrives upon the other side of the metallic bush 11. The purpose of the separable flange 13 is to enable disassembly of the metallic bush 11 and flyer block so that either may be replaced when worn. The flyer can thus be disassembled, parts renewed and put back together at the mill without sending the flyer back to the factory.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved flyer comprising a block, wires carried by the block, a resilient bushing through the block having a bore therethrough with longitudinal circumferentially spaced grooves communicating with the bore and ribs between the grooves having inner surfaces for engaging the spindle.

2. An improved flyer comprising a block, wires carried by said block, a metallic bush through said block, and a resilient bushing having resilient outstanding flanges at its ends for being compressed to force the rubber bushing through the metallic bush.

3. An improved flyer comprising a block, wires carried by the block, a metallic bush having an outstanding flange at one end for engaging against the block at one side and having a cylindrical portion for extending through the block, a detachable metallic flange for the bush engaging at the opposite side of the block, and a resilient bushing having outwardly extending flanges at its ends for being forced through the bushing and said detachable flange, said resilient bushing having an opening to receive the spindle.

4. An improved flyer comprising a block having an abutment at one end and an opening at the other end, flyer wires engaging said abutment, and a pin for detachable engagement in the opening having a groove to receive the flyer wires.

5. An improved flyer comprising a block having an abutment at one side and an opening at the other side with a grooved intermediate portion, a pair of flyer wires having semi-circular intermediate portions engaging in the grooved part of the block and having at one side resilient arms crossed upon said abutment and at the other side another pair of crossed resilient arms, and a detachable pin having a grooved portion on which the last mentioned crossed arms are adapted to resiliently close, said pin having a trunnion for removably fitting in the opening and being locked therein by the resilient engagement of the arms in said groove.

6. An improved flyer comprising a block having an intermediate grooved portion and an abutment at one side, resilient flyer wires having intermediate portions engaged removably with the grooved part of the block, said wires having resilient ends crossed upon said abutment, said flyer wires further having resilient crossed ends at the opposite side from said abutment, and means detachably engaging the block and said last mentioned arms for holding the flyer wires detachably upon the block.

7. An improved flyer comprising a flyer block, wires carried thereby, a bushing removably received through said block and having resilient flanges at its end portions outstanding from the intermediate portion of the bushing to lie against opposite faces of said block, said resilient flanges being compressible to permit removal and insertion of the bushing through the block.

WILLARD T. MUNSON.